United States Patent
Schinckel et al.

(10) Patent No.: US 12,429,880 B2
(45) Date of Patent: Sep. 30, 2025

(54) GENERATING CHARACTERISTICS WITH A REMOTE CLASSIFIER AND CONTROL SYSTEM

(71) Applicant: Deere & Company, Moline, IL (US)

(72) Inventors: Sarah L. Schinckel, Ankeny, IA (US); Kevin Seidl, W. Des Moines, IA (US); Andrew D. Greenlee, Moline, IL (US); Stefan Plonka, Saarbrücken (DE); Thiago Henrique Burgos de Oliveira, Enkenbach-Alsenborn/Rheinland-Pfalz (DE); Nikolaus D. Wire, Neustadt/Weinstrasse (DE)

(73) Assignee: DEERE & COMPANY, Moline, IL (US)

( * ) Notice: Subject to any disclaimer, the term of this patent is extended or adjusted under 35 U.S.C. 154(b) by 250 days.

(21) Appl. No.: 18/163,953

(22) Filed: Feb. 3, 2023

(65) Prior Publication Data

US 2024/0264593 A1 Aug. 8, 2024

(51) Int. Cl.
*A01B 76/00* (2006.01)
*G05D 1/00* (2024.01)

(52) U.S. Cl.
CPC ......... *G05D 1/0221* (2013.01); *G05D 1/0219* (2013.01)

(58) Field of Classification Search
CPC ............. G05D 2101/15; G05D 1/6482; G05D 1/6484; A01B 79/00
See application file for complete search history.

(56) References Cited

U.S. PATENT DOCUMENTS

| | | | | |
|---|---|---|---|---|
| 2016/0078363 | A1* | 3/2016 | Hodel | G05B 13/0265 706/12 |
| 2018/0242515 | A1* | 8/2018 | Yajima | A01G 25/167 |
| 2019/0050948 | A1 | 2/2019 | Perry et al. | |
| 2022/0099584 | A1* | 3/2022 | Stremlau | G06T 7/90 |
| 2023/0240170 | A1* | 8/2023 | Goering | A01B 79/005 172/1 |
| 2023/0350409 | A1* | 11/2023 | Mähler | A01B 69/008 |
| 2024/0172577 | A1* | 5/2024 | Kubota | G07C 5/0816 |

FOREIGN PATENT DOCUMENTS

DE 102022100945 A1 7/2022

OTHER PUBLICATIONS

German Search Report issued in application No. 102024100117.8 dated Aug. 6, 2024, 10 pages.

* cited by examiner

*Primary Examiner* — Adam R Mott
*Assistant Examiner* — Heather J Keniry
(74) *Attorney, Agent, or Firm* — Christopher J. Volkmann; KELLY, HOLT & CHRISTENSON PLLC

(57) ABSTRACT

Sensor data from an agricultural machine performing an operation in a field is collected. The type of operation can be output to a control system for processing and use in controlling operations. The control system generates work records and controls a data store to store the work records for exposure to external systems.

17 Claims, 16 Drawing Sheets

GENERATING CHARACTERISTICS WITH A REMOTE CLASSIFIER AND CONTROL SYSTEM

FIELD OF THE DESCRIPTION

The present description relates to mobile work machines. More specifically, the present description relates to a classifier that receives data from a mobile work machine and that generates a classification output to identify characteristics of the mobile work machine, an operation, and/or the geographic region where the mobile work machine performs the operation.

BACKGROUND

There are a wide variety of different types of mobile work machines. Such machines include agricultural machines, construction machines, forestry machines, turf management machines, etc. Agricultural machines, for instance, include such things as harvesters, tillage machines, tractors, sprayers, planting machines, among others. Some such machines have relatively complex position tracking, sensors, and processing components that can be used to identify characteristics of the machine (e.g., agronomic characteristics of the agricultural machine), an operation preformed by the machine, where the machine operated, etc. However, many machines are not equipped with that type of tracking, sensing, and processing equipment.

The discussion above is merely provided for general background information and is not intended to be used as an aid in determining the scope of the claimed subject matter.

SUMMARY

Sensor data from a mobile work machine performing an operation at a worksite is collected. The type of operation can be output to a control system for processing and use in controlling operations. The control system generates work records and controls a data store to store the work records for exposure to external systems.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, there are many different types of mobile work machines that do not have complex sensing and communication systems. The present discussion thus proceeds with respect to a system that collects machine data and other data and sends that data to a remote classifier that classifies the data to identify the type of operation that the machine is performing, and where the machine is performing that operation, as well as a wide variety of other agronomic data, such as machine data, operation data, location data, etc.

In one example, the classified data also represents a boundary that identifies the boundary of the area where the operation is being performed (e.g., a field boundary). The classified data can be presented to an operator or user for confirmation or editing, or the classified data can be generated in a fully automatic way. A control system generates control signals based upon the classified data. For instance, the control system can generate data storage control signals to control a data storage system to store the data. The control system can also process the classified data to further define or identify characteristics, such as the boundary, a map, work records with other metadata, etc.

The present discussion proceeds with respect to the mobile work machine being an agricultural machine, but could just as easily proceed with respect to the mobile work machine being a construction machine, a forestry machine, a turf management machine, or another mobile work machine. The discussion of an agricultural machine is for the sake of example only.

Figure 1:
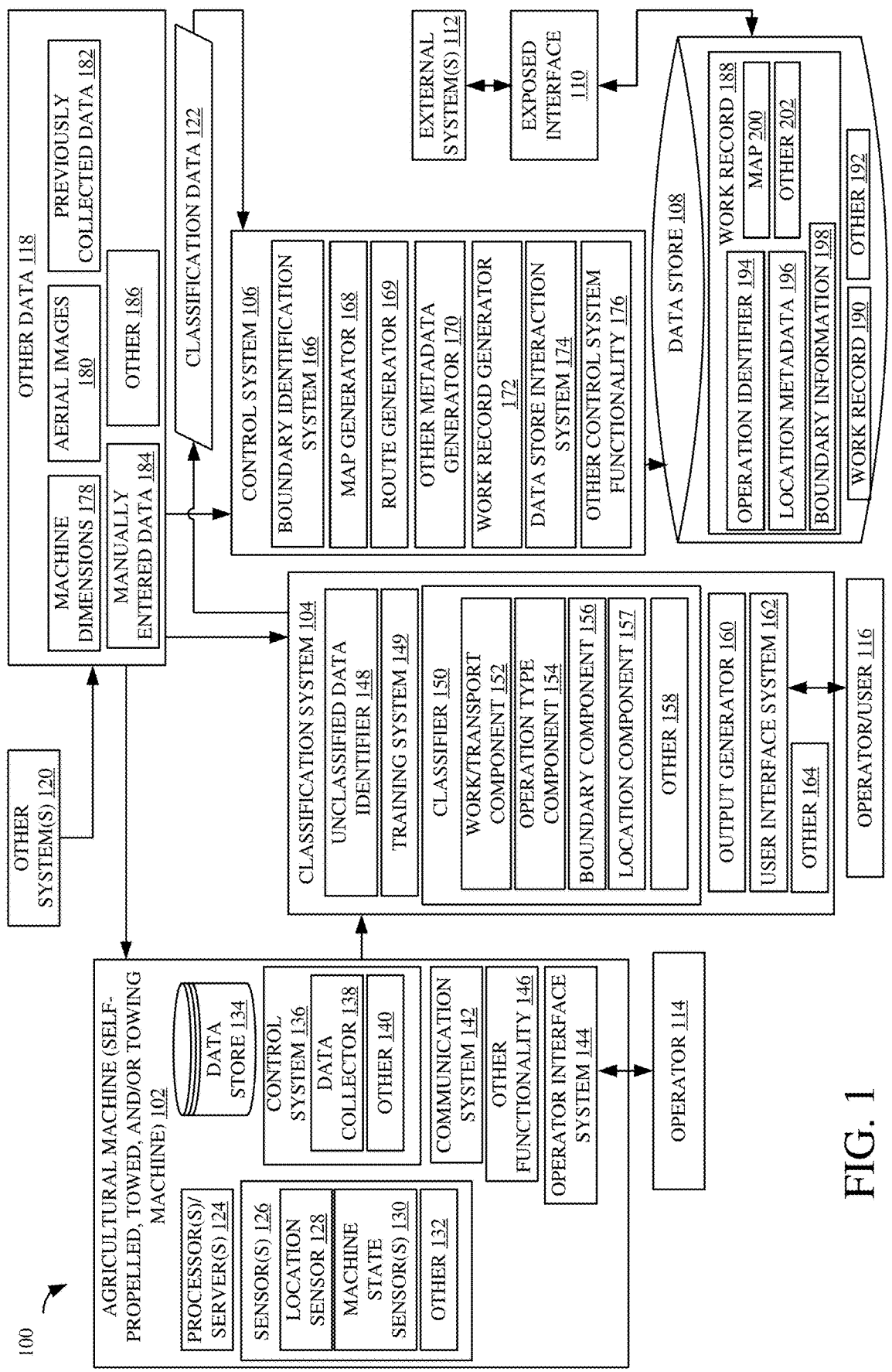
FIG. 1 is a block diagram of one example of an agricultural system.

FIG. 1 is a block diagram of one example of an agricultural system 100 that includes an agricultural machine 102 which may be a self-propelled machine, a towed machine, and/or a towing machine. System 100 also includes a classification system 104, a control system 106, data store 108, an exposed interface 110, and one or more external systems 112. FIG. 1 also shows that operator 114 can operate agricultural machine 102 and an operator or user 116 can interact with classification system 104. Systems 104 and 106 and machine 102 can also receive other data 118 from other systems 120. Other systems 120 can include, for example, cloud-based systems which store aerial images, manufacturer systems that store machine dimensions, farm manager systems that store information that was previously collected in a field during a previous operation, manually entered data, or any of a wide variety of other systems that can generate and provide other data 118.

In one example, classification system 104 receives machine data from agricultural machine 102 and may receive one or more pieces of other data 118. Classification system 104 classifies the data to generate classified data, indicative of a type of operation being performed by machine 102 and can identify other things as well, as classification data 122. Control system 106 uses classification data 122 to perform further processing and generate control signals. The control signals can include data store control signals that control data store 108 to store records and other information generated by control system 106. Data store 108 can expose an application programming interface (API) 110 so that external systems 112 can access the data stored in data store 108. External systems 112 can include farm manager systems, vendor systems, manufacturer systems, or any of a wide variety of other external systems.

Before describing the overall operation of agricultural system 100 in more detail, a description of some of the items in agricultural system 100, and their operation, will first be provided. Agricultural machine 102 can include one or more processors or servers 124, sensors 126 (which can include location sensor 128, machine state sensors 130, and other sensors 132), data store 134, control system 136 (which can include data collector 138 and other items 140), communication system 142, operator interface system 144, and a wide variety of other machine functionality 146.

Classification system 104 can include unclassified data identifier 148, training system 149, classifier 150 (which can include work/transport component 152, operation type component 154, boundary component 156, location component 157, and other items 158), output generator 160, user interface system 162, and other items 164. Control system 106 can include boundary identification system 166, map generator 168, route generator 169, other metadata generator 170, work record generator 172, data store interaction system 174, and other control system functionality 176.

Other data 118 can include machine dimensions 178, aerial images 180, previously collected data 182, manually entered data 184, and other items 186. Data store 118 can store one or more work records 188-190 and other items 192. Each work record 188 can include an operation type identifier 194, location metadata 196, boundary information 198, map 200, and other information 202.

Sensors 126 sense a characteristic, parameter, variable value, or other item (referred to herein as a machine characteristic, some examples of which are described elsewhere herein) that is responsive to agricultural machine 102 performing an operation (whether it is a transport operation or an agricultural work operation). Location sensor 128 can be a global navigation satellite system (GNSS) receiver, a dead reckoning system, a cellular triangulation sensor, or any of a wide variety of other sensors that generate an output indicative of the location of sensor 128 in a global or local coordinate system. Machine state sensors 130 can sense a wide variety of machine states, such as engine speed (e.g., RPM), fuel level, fuel consumption, engine torque, ground speed, whether certain machine functionality 146 is operating (such as the power take off, etc.), among other things. Other sensors 132 can sense environmental characteristics, crop characteristics, or other machine characteristics.

Data collector 138 in control system 136 can collect data from sensors 126 and other sources (such as manually entered data that may be entered by operator 113 through operator interface system 144) and provides that collected data to communication system 142. Communication system 142 can be a controller area network (CAN) bus and bus controller, which enables communication of the items on agricultural machine 102 with one another and with other items in system 100. Communication system 142 can also be a wide area network communication system, a near field communication system, a local area network communication system, a cellular communication system, a Wi-Fi system, a Bluetooth system, or another communication system or combination of communication systems. Communication system 142 can communicate the data collected by data collector 138 to classification system 104 and other items. Communication system 142 can also communicate with other systems 120, external systems 112, control system 106, or other items.

Operator interface system 144 includes operator interface mechanisms that can provide outputs to operator 114 and receive inputs from operator 114. Therefore, operator interface system 144 can include a display screen, a touch sensitive display screen, or another display device. The display device can display operator actuatable mechanisms (such as icons, links, buttons, etc.) that can be actuated by operator 114 using a point and click device, using touch gestures, using voice commands (where speech recognition and speech synthesis are provided), or in other ways. Operator interface system 144 can also include a steering wheel, joysticks, pedals, knobs, linkages, levers, or other mechanisms. Operator interface system 144 can thus provide audio, visual, and/or haptic outputs to operator 114 and receive operator inputs.

Unclassified data identifier 148 in classification system 104 can detect whether data received from agricultural machine 102 has already been classified or is unclassified. For instance, once the data has been classified, it may be augmented with metadata or other information indicating that it has been classified. If it has not yet been classified, then unclassified data identifier 148 provides the data to classifier 150. Classifier 150, which can be trained by training system 149, generates a classifier output based upon the input data. The classifier output may indicate a characteristic, parameter, variable value, or other item (hereinafter referred to as an operation characteristic, some examples of which are described elsewhere herein) that is responsive to the machine or operation being performed, or a wide variety of other things. For instance, work/transport component 152 may classify the input data to generate an operation characteristic indicating that the data corresponds to agricultural machine 102 performing a work operation or that agricultural machine 102 is in transport (performing a transport operation). The operation characteristics may also indicate other classes as well, such as machine pose, whether the machine is in idle, performing a turn, or other classes. Operation type component 154 classifies the input data to generate an operation characteristic indicative of the specific type of operation being performed by agricultural machine 102 (such as tillage, planting, seeding, material application, harvesting, mowing, baling, etc.). Boundary component 156 can classify the data to generate an operation characteristic indicative of a boundary of the work area (e.g., the field) where agricultural machine 102 was performing a work operation. Location component 157 can classify the data to generate an operation characteristic indicative of a location (such as a transport route, the route followed by agricultural machine 102 in performing the operation, the location where certain machine characteristics occurred, etc.) where agricultural machine 102 was in transport, or performing a work operation. These are only examples of some different operation characteristics.

Output generator 160 generates an output indicative of the operation characteristics output by classifier 150, as classification data 122. Classification data 122 can first be provided through user interface system 162 to an operator or user 116 for verification. For instance, if classifier 150 generates an output indicating that agricultural machine 102 was in transport, this may be surfaced (e.g., displayed or otherwise output using user interface system 162) to operator/user 116 for confirmation. If, agricultural machine 102 was actually in transport, the classification data 122 may be confirmed by operator/user 116 actuating an input mechanism or otherwise indicating a confirmation of that classification. Instead, if agricultural machine 102 was preforming a work operation (such as a tillage operation), then operator/user 116 may dismiss the classification data and/or edit it to indicate the proper classification. Similarly, the operation type, the boundary data, the location data, or other operation characteristic output by classifier 150 may be output through user interface system 162 to operator/user 116 for confirmation, dismissal, editing, etc. The user interactions can be detected by user interface system 162 and returned to training system 149. Training system 149 can train classifier 150 based on the user confirmation, dismissal, or edits of the classification data 122. Training system 149 can perform supervised or unsupervised training using labelled or unlabelled training data as well as the user interactions (confirm, edit, dismissal) of the classification data 122.

It will be noted that, in performing the classification, classifier 150 may take advantage of other data 148. For instance, in order to identify the boundary location where agricultural machine 102 is performing an agricultural operation, classifier 150 may access the machine dimensions 178. Similarly, in order to determine whether agricultural machine 102 is in transport or in a field performing a work operation, classifier 150 may access aerial images 180 or other previously collected data 182 (such as map data which identifies public roads, fields, etc.) or any of a wide variety of other data.

Control system 106 receives classification data 122 and may also access other data 118. Boundary identification system 166 can process the classification data to generate an output indicative of or defining the boundary of the field where agricultural machine 102 was performing an agricultural operation. Map generator 168 may generate a map output that maps operation characteristics, machine characteristics, or other information to geographic locations. Route generator 169 can generate an output indicative of the route followed by machine 102. Other metadata generator 170 can generate other metadata. Work record generator 172 generates a work record corresponding to the classification data 122. The work record may include boundary information, route information or other location information, map information, or other metadata corresponding to the classification data 122. Data store interaction system 174 can generate a control signal to control data store 108 in order to store the work record 188 in data store 108.

It will be noted that some or all of the functionality in control system 106 can be incorporated into, and performed by, classification system 104, and vice versa. For example, instead of providing a set of data points from classification system 104 classified as "boundary points" and then performing separate processing in control system 106 to define the boundary, all of that processing can be performed by classification system 104. This is just one example.

As shown in data store 108, work record 188 may include an operation type identifier 194 which identifies whether the work record corresponds to data generated when agricultural machine 102 is performing a work operation or a transport operation, as well as identifying the specific type of operation (e.g., tillage, harvesting, material application, mowing, baling, planting or seeding, etc.). Location metadata 196 may include location information, such as an indication of the route followed by agricultural machine 102 during the operation, heading information indicative of the heading of the agricultural machine 102 at various points during the operation, the location where machine characteristics were sensed, or other location metadata 196. Work record 188 can include boundary information 198 that identifies the boundary of the operation that was performed by work machine 102 and that, corresponds to work record 188. Work record 188 can also include a map 200 that maps various machine characteristics, or operation characteristics to geographic locations.

In one example, data store 108 exposes an interface 110 for access by external systems 112. External systems 112 can obtain access to the various work records 188-190 and other information 192 in data store 108 by calling the exposed interface 110.

It can thus be seen that, in one example, classification system 104 can be disposed on machine 102 or in a remote server environment, remote from agricultural machine 102 (in that system 104 does not reside on agricultural machine 102. Therefore, when classification system 104 is located remotely from machine 102, the communication system 142 on agricultural machine 102 need only be able to communicate the information, in some way, to classification system 104 and all of the classifications and functions performed by classification system 150 (and processing performed by control system 106) can be performed in the remote server environment. Thus, the agricultural machine 102 need not have highly complex sensing and processing systems, but relatively detailed information can still be generated based upon the machine characteristics obtained from machine 102.

Figure 2:
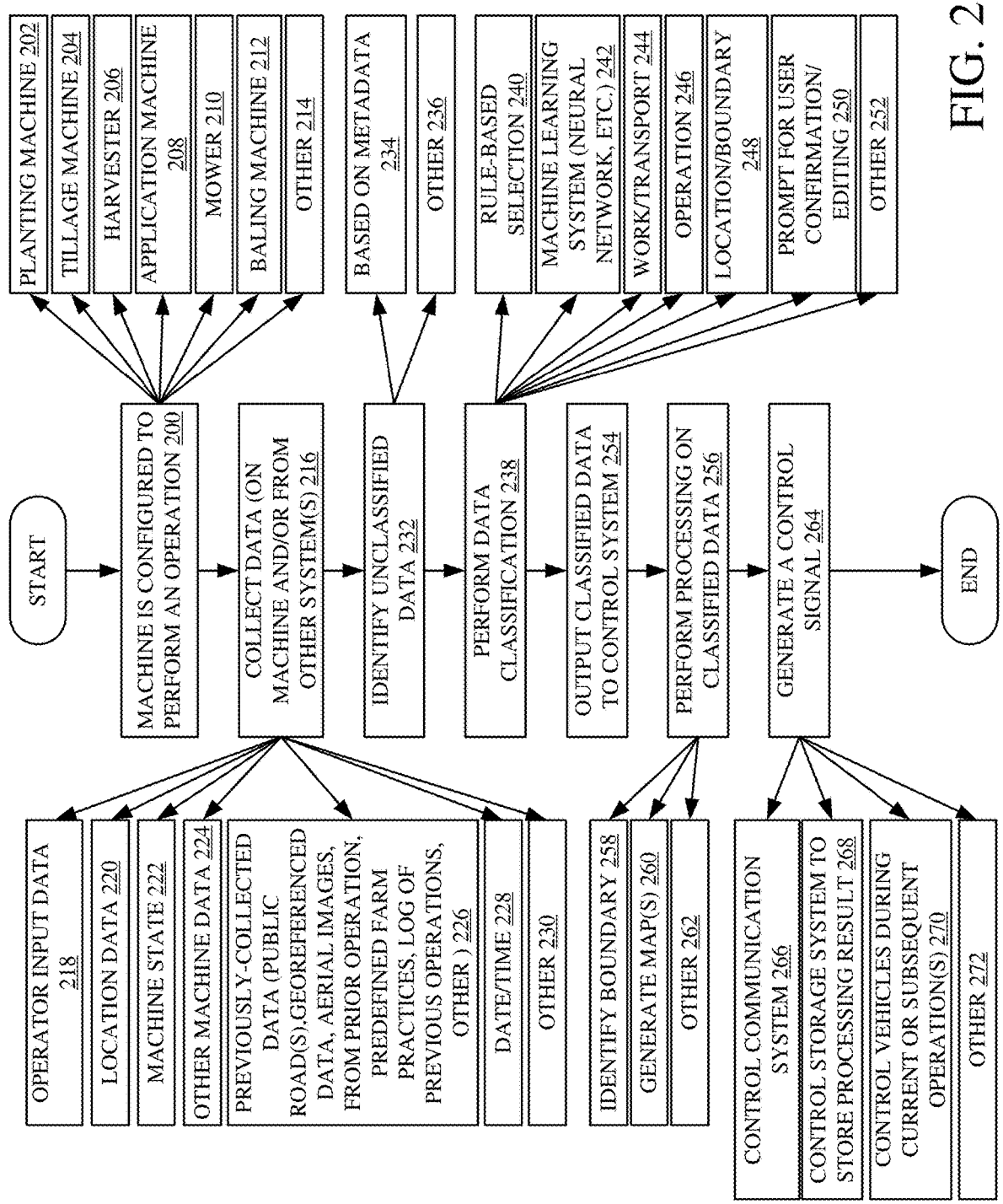
FIG. 2 is a flow diagram illustrating one example of the operation of the agricultural system.

FIG. 2 is a flow diagram illustrating one example of the operation of agricultural system 100 in collecting, classifying, and processing data for generating control signals. It is first assumed that agricultural machine 102 is configured to perform an operation, as indicated by block 200 in the flow diagram of FIG. 2. As discussed above, agricultural machine 102 can be a planting machine 202, tillage machine 204, harvester 206, application machine 208, mower 210, baling machine 212, and/or another agricultural machine 214.

Data collector 138 collects machine characteristics and other data for classification by classification system 104. Collecting the data is indicated by block 216. The collected data can include operator input data 218 input by operator 114. For example, the operator 114 may provide an input that may help classification system 104 perform the classification. The input may for example, be a field selection where the operator selects a field. The input may indicate that an agricultural operation started or stopped, the operation type, crop type, etc. The operator inputs may be provided through an interface display, a mobile application, or in another way. The data can be location data 220 generated by location sensor 128, or machine state data 222 generated by machine state sensors 130. The data can be other machine data, such as machine dimensions 178, other sensed data, CAN bus data, or any of a wide variety of other machine data 224. The data can be previously collected data 182, which can include an indication of public roads, other georeferenced data, aerial images, data from prior operations, predefined farm practices, a log of previous operations, or other previously-collected data 226. The data collected by data collector 138 can be date and time data 228 and/or other data 230.

Unclassified data identifier 148 identifies the data as being unclassified data and as needing classification by classifier 150. Identifying the unclassified data is indicated by block 232 in the flow diagram of FIG. 2. The status of the data as being unclassified can be based upon metadata 234, or it can be identified as unclassified in a wide variety of other ways 236.

Classifier 150 then performs data classification, as indicted by block 238. The classifier 150 can be a rule-based classifier 240, a machine learning system (such as an artificial neural network, a model or simulation-based classifier, or another classification system) as indicated by block 242. It will be noted that classifier 150 may generate an output indicative of all the different types of operation characteristics (such as work or transport classification, operation type classification, boundary data classification, location data classification, etc.), using a single classifier or individual classifiers or components (such as components 152-158) can be used to generate an output indicative of the different operation characteristics or configurations thereof, such as whether the operation was a work operation or a transport operation, as indicated by block 244, the type of operation, as indicated by block 246, whether the data corresponds to a boundary or route or other location, as indicated by block 248, or other information 250. The classification system 104 can control user interface system 162 to prompt the user for confirmation, dismissal, or editing of the operation characteristics, output by classifier 150 as indicated by block 252.

Output generator 160 then generates an output indicative of the classification data output 122 indicative of the operation characteristics output by classifier 150, and provides that output to control system 106. Outputting the classification data 122 is indicated by block 254 in the flow diagram of FIG. 2. Control system 106 then performs processing on the classification data 122, as indicated by block 256.

Boundary identification system 166 can process the information classified as boundary information to define or otherwise identify a boundary of the operation corresponding to the classification data 122. Identifying the boundary is indicated by block 258. Map generator 168 can process location information in the classification data 122 to generate map 200, as indicated by block 260. Route generator 169 can process data classified as location and heading data to identify the route of agricultural machine 102. Other data can be generated and work record generator 172 generates a work record 188 with the classification data and/or derived data and provides that work record 188 to data store interaction system 174. Performing other processing and generating other information is indicated by block 262 in the flow diagram of FIG. 2.

Control system 106 generates one or more control signals based upon the work record 188 or other information generated by control system 106. Generating the control signal is indicated by block 264 in FIG. 2. Control system 106 can generate communication control signals 266 to communicate the information to other systems. The data store interaction system 174 can generate control signals to control the data store 108 to store the work record or other processing results, as indicated by block 268. The control signals can be used to control machine 102 during the current operation or to control vehicles during subsequent operations, as indicated by block 270, or used in a wide variety of other ways as indicated by block 272.

Figure 3:
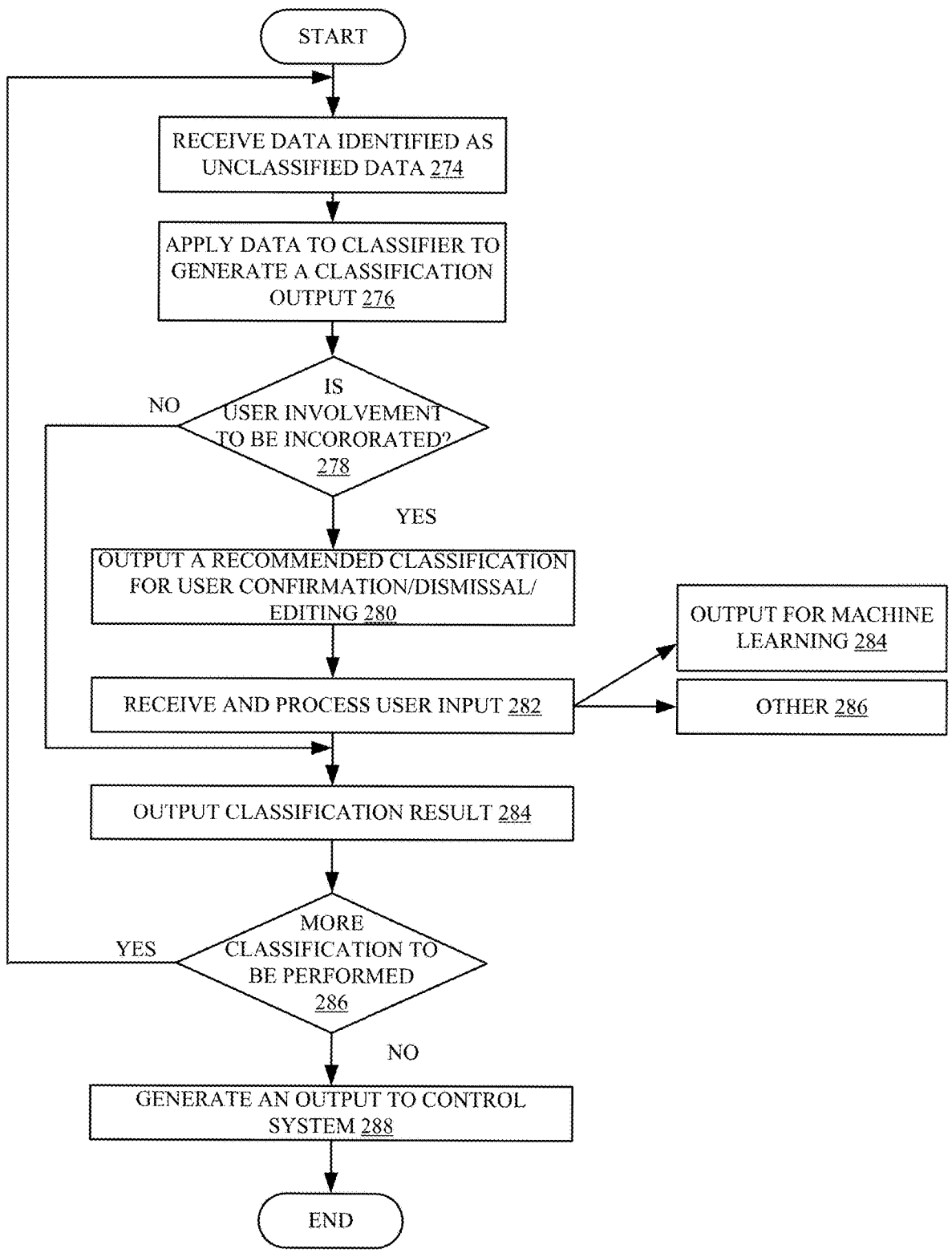
FIG. 3 is a flow diagram showing one example of classifying data.

FIG. 3 is a flow diagram illustrating one example of the operation of classification system 104 and/or control system 106 in more detail. Classifier 150 receives machine characteristic data that has been identified as unclassified data and in need of classification, as indicated by block 274 in the flow diagram of FIG. 3. The data is applied to the classifier 150 to generate a classification result representing an operational characteristic, as indicated by block 276. If operator/user involvement is to be incorporated into the process, as indicated by block 278, then the classification result is output for operator/user confirmation/rejection/editing, etc., as indicated by block 280. The input from operator/user 116 (the user's interaction with the classification result) can then be detected by user interface system 162 and used to reclassify the data, as desired by the operator/user, 116. The user interaction can also be used by training system 149 to perform machine learning on the classifier 150 to improve the performance of the classifier 150. Receiving and processing the user input is indicated by block 282. Using the operator input for machine learning in order to improve the classifier 150 is indicated by block 284. The user input can be received and processed in other ways as well, as indicated by block 286.

The classification result (the operational characteristic output by classifier 150 and/or as confirmed or edited by operator/user 116), is then output as classification data 122. Output generator 160 generates the output and provides the output to control system 106. Outputting the classification data 122 is indicated by block 284.

If more classification is to be performed, as indicated by block 286 (e.g., if additional classifications are to be performed based upon the received data), then processing reverts to block 274. When the classification is completed, then output generator 160 generates an output indicative of any additional classification data 122 and provides that data to control system 106. Generating an output of the additional classification data 122 is indicated by block 288 in the flow diagram of FIG. 3.

A number of different types of operational characteristics represented by the classification data 122 will now be described, although these are described for the sake of example only. The classification data 122 can classify certain data as originating during transfer of the agricultural machine 102, or as originating during field work. The classification data 122 can identify the specific operation type. If the operation type is a work operation in a field, the boundary component 156 can identify the geographic extent where the work data originated, and identify the machine dimensions, and generate an output indicative of data points lying on the boundary of the work operation. When the data is identified as not originating from a field, the data can be classified as transport data. In order to perform the classification, the classifier 150 may obtain access to such things as historic field data. For instance, if the current day is in the historic harvest season for the current field, and historic field data indicates that the current field has already been harvested, then the classifier may be more likely to classify a current operation as a tillage operation. However, if the historic data indicates that the field has not yet been harvested, and the current time is in the middle of the growing season, then the classifier may be more likely to classify the current operation as a material application (e.g., sprayer) operation. The historic farm practice data may indicate that, at a certain point in the growing season, the farmer normally performs a spraying operation, or, during a certain period, harvesting or tillage is normally performed, given the crop type planted in the field, given weather conditions, etc. This type of historic farm practice data can be used to enhance the accuracy of the classification as well.

One example will now be described in more detail. Assume that agricultural machine 102 is a tillage machine and that an operator uses machine 102 to perform a tillage operation. Data collector 138 on machine 102 collects location data from location sensor 128 and machine state data from machine state sensors 130. This data is then transmitted using communication system 142 to classification system 104 (such using cellular, Wi-Fi, USB communication, etc.). Unclassified data identifier 148 then recognizes that the newly collected data lacks classifying metadata and provides the collected data to classifier 150. Classifier 150 classifies the data based upon available information, such as the machine movement pattern (e.g., whether machine 102 moves back and forth in rows-such as during a tillage operation, or in a straight line along a road—such as during transport), the current season, previous farm practices, the type of equipment attached, machine use statistics, etc. Classifier 150 then generates a classification output which is surfaced for operator/user 116 through user interface system 162. The output to user 116 indicates that the data has not yet been classified, and also indicates a recommended classification identifying an operation type (e.g., tillage operation) and a recommended field boundary. Operator/user 116 can then accept or dismiss some of or all of the recommended work classification and boundary classification or edit any or all of those classifications or definitions. Classification system 104 then provides the classification data 122 to control system 106 for further processing.

In performing the classification, classification system 104 can use a wide variety of different types of data, or derived data. Some representations of machine characteristics and operation characteristics and derived information are described with respect to FIGS. 4-11.

Figure 4:
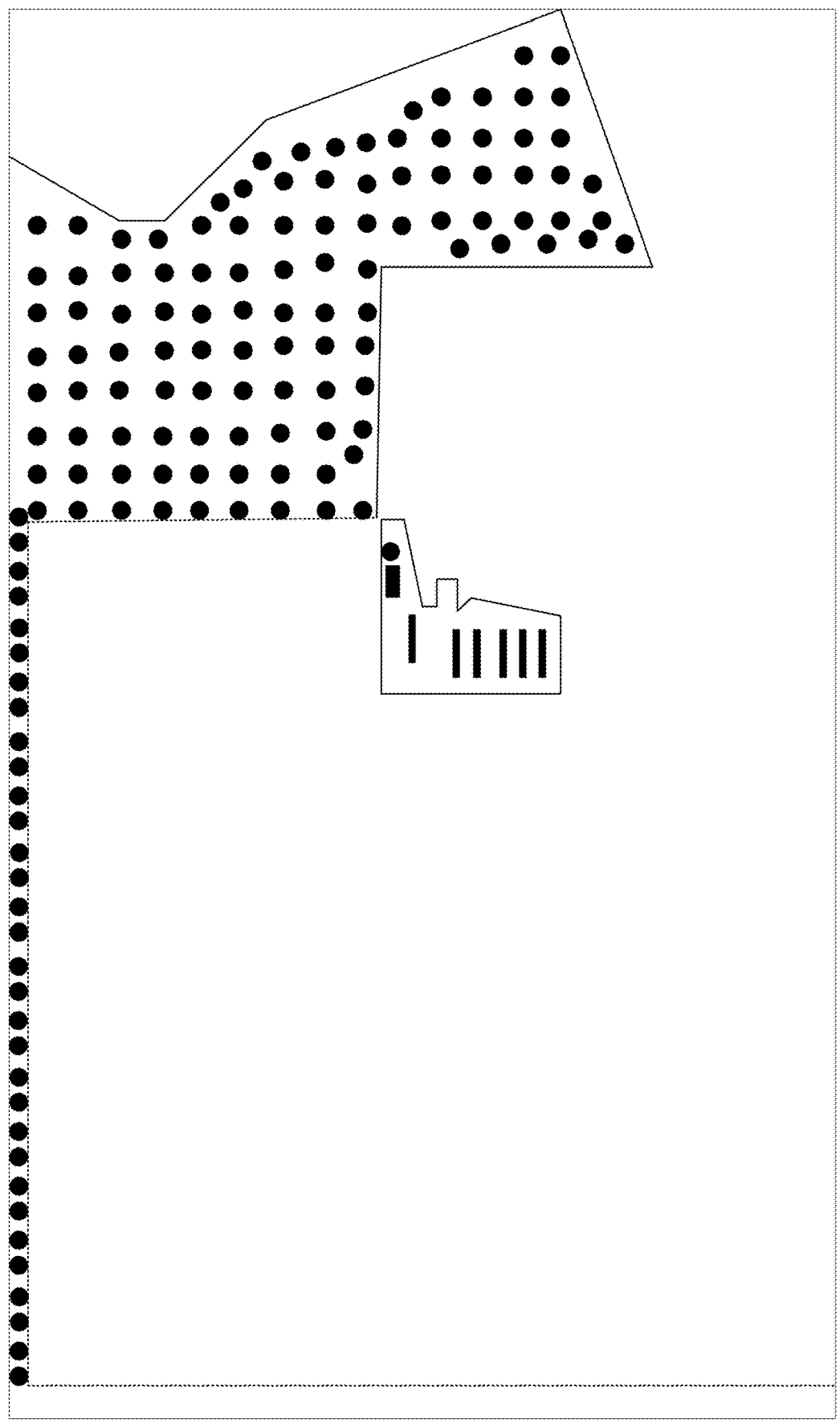
FIG. 4 is a pictorial illustration showing one example of a map output showing geolocation data.
Figure 5:
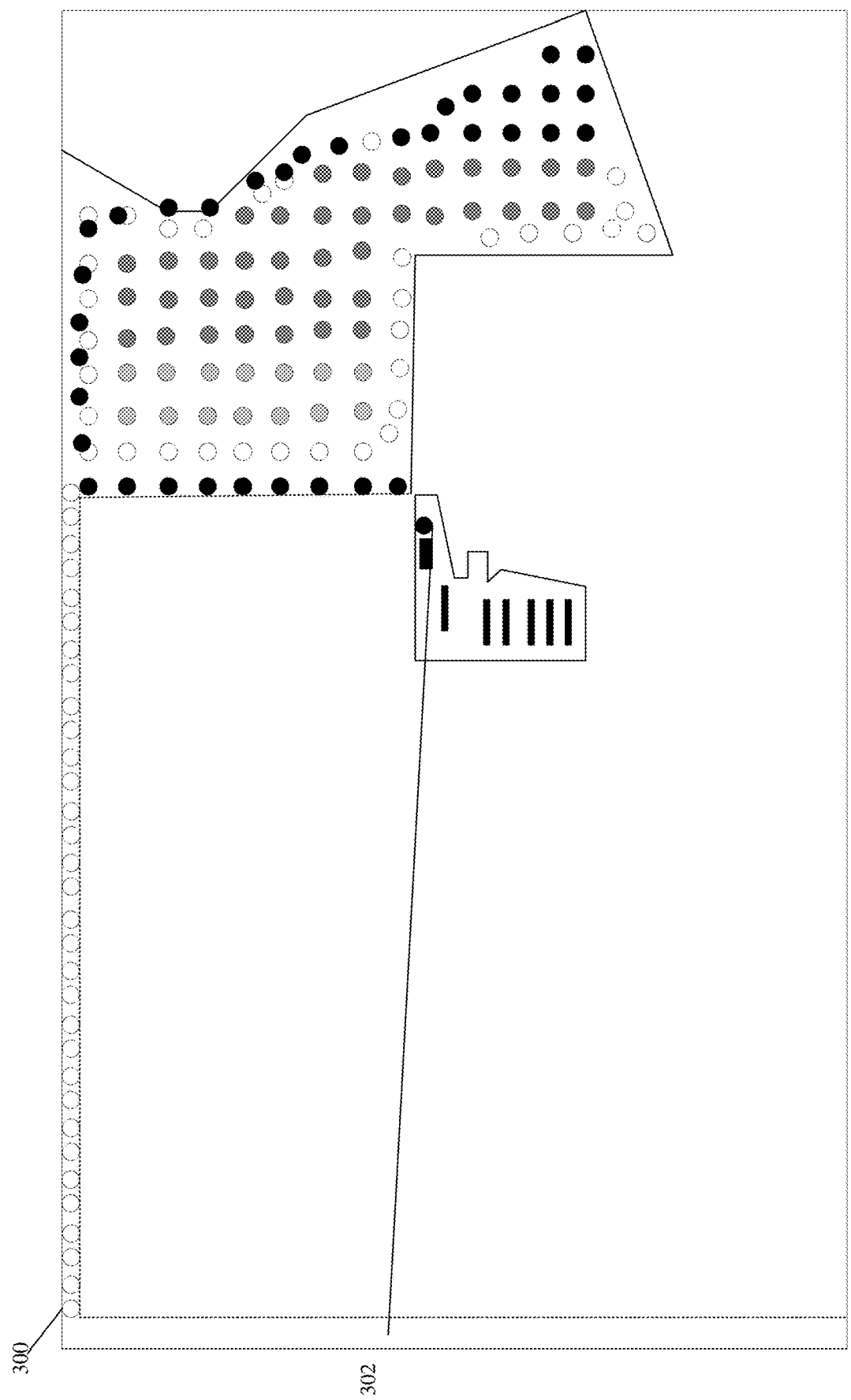
FIG. 5 is a pictorial illustration showing one example of a map output showing timestamped geolocation data.

For instance, FIG. 4 is a pictorial illustration indicating the geographic locations where machine state and location data was captured on machine 102. Each of the black dots in FIG. 4 identifies a geographic location where data was captured on machine 102. FIG. 5 shows the same data as that shown in FIG. 4, except that the data is displayed in a way that shows the temporal nature of the data. Lighter dots are indicative of data that was collected earlier in time and darker dots are indicative of data that was collected later in time. The time can be obtained from time and date metadata attached to the machine characteristic or in other ways. Therefore, it can be seen that the data from machine 102 was first collected, at the earliest point, at location 300, and the most recent data (that collected at the latest point in time) was collected at location 302. The pictorial illustrations in FIGS. 4 and 5 can be output for user interaction or stored in data store 108 or processed in other ways.

Figure 6:
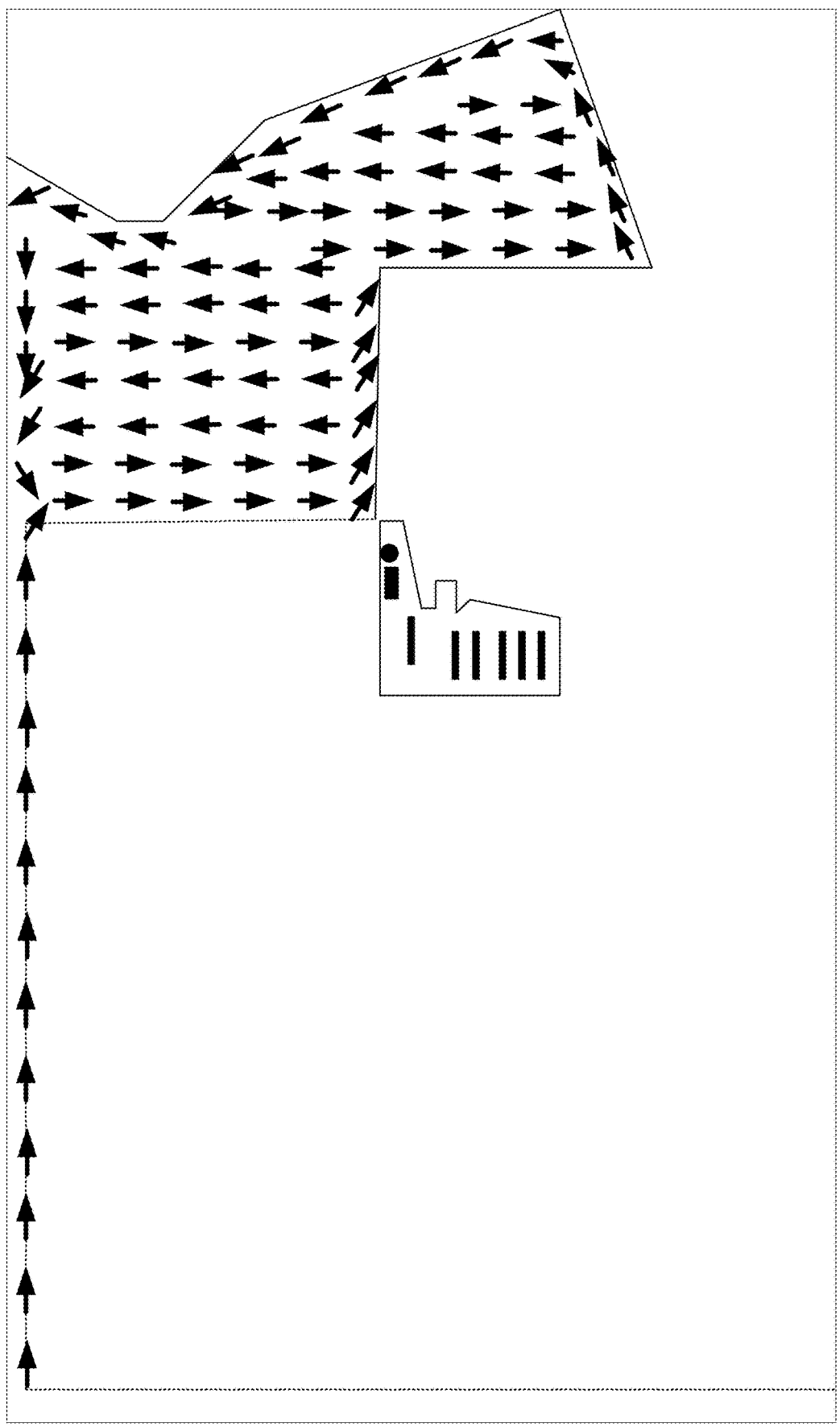
FIG. 6 is a pictorial illustration showing one example of a map output showing georeferenced heading data.

FIG. 6 is a pictorial illustration of georeferenced heading data. That is, at each of the points illustrated in FIGS. 4 and 5, FIG. 6 displays the machine heading (e.g., FIG. 6 shows that the vehicle was moving in the direction indicated by the arrows) at each of those geographic points. Thus, FIG. 6 provides an indication of the route that was followed by agricultural machine 102 as the data was collected.

Figure 7:
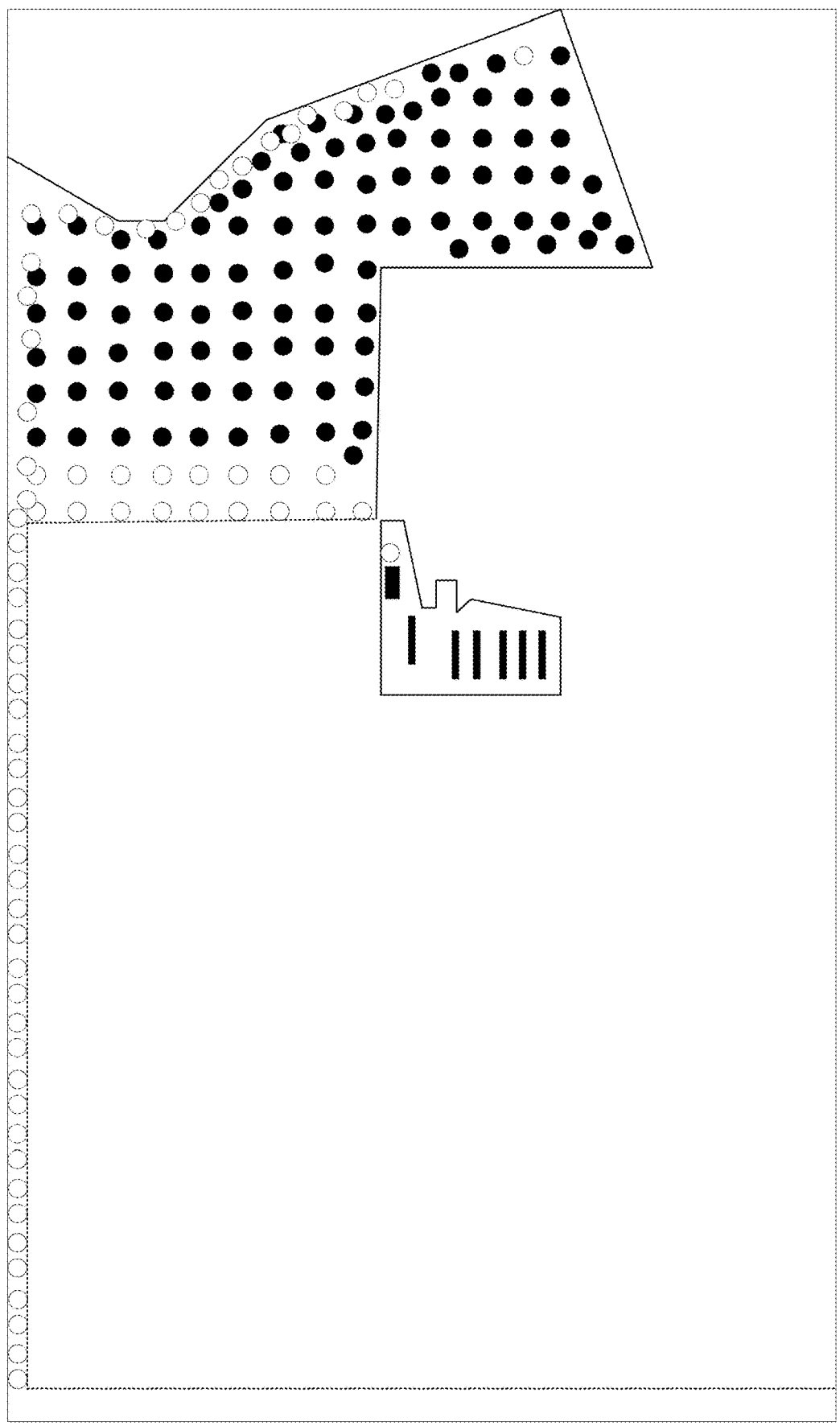
FIG. 7 is a pictorial illustration showing one example of a map output showing georeferenced machine status.

FIG. 7 is a pictorial illustration of georeferenced machine state data. The white dots indicate that the state of a particular machine functionality was off, while the black dots indicate that the particular machine functionality was on. For instance, in FIG. 7, the color of the dots may indicate the geographic locations where machine state data was taken and whether the machine state data indicates that the power take-off was on or off at that location, or whether automated steering functionality was engaged or disengaged at that location, etc. This type of data can be used in classifying the data as corresponding to a transport operation, an agricultural work operation, etc. By way of example, if the power take-off and automated steering were both off at a particular location, then the data can more likely be classified as transport data. However, if the power take-off and automated steering were both on at a particular geographic location, then the data for that location can more likely be classified as corresponding to a work operation.

Figure 8:
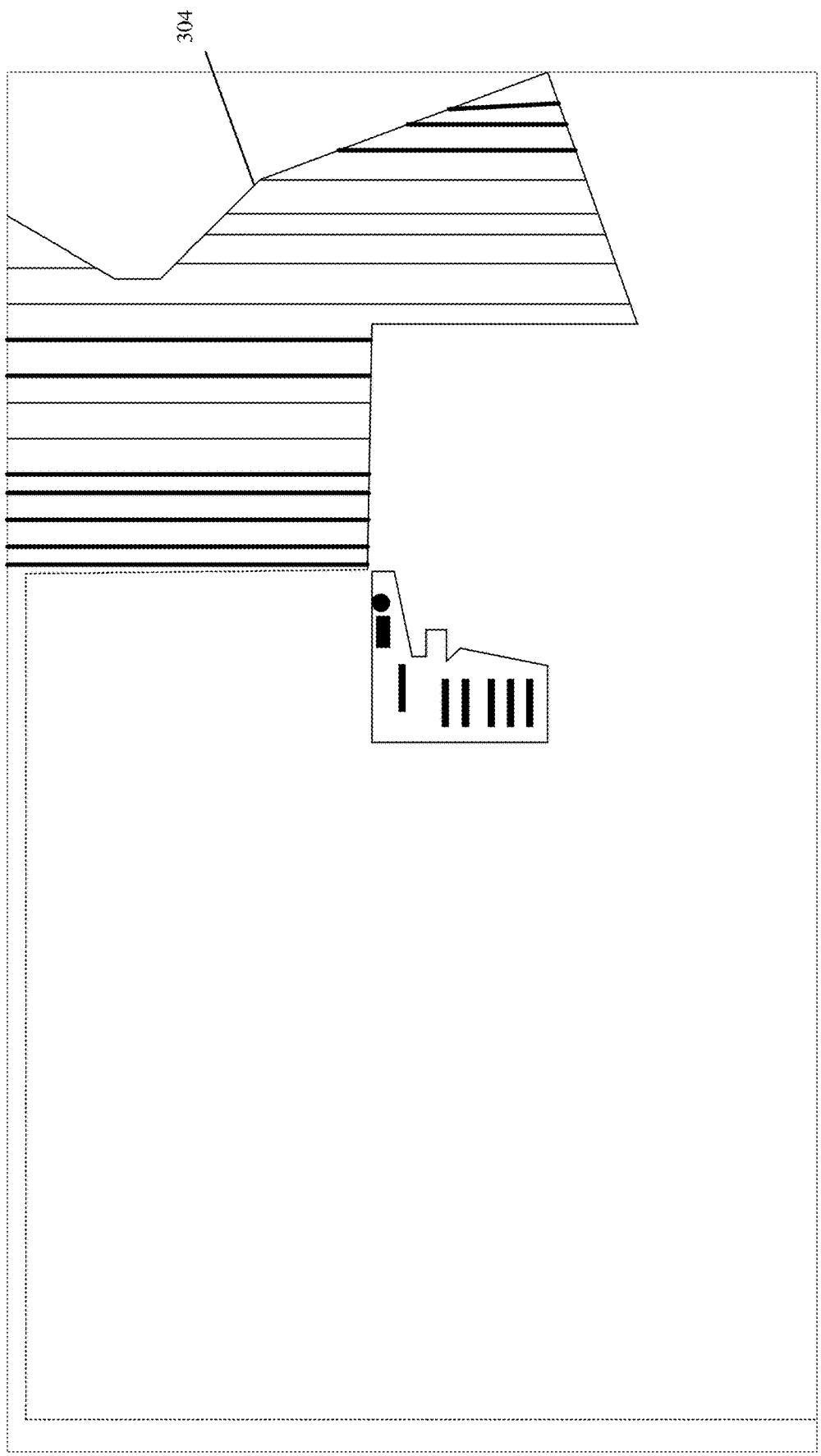
FIG. 8 is a pictorial illustration showing one example of a derived field work map.

FIG. 8 is a pictorial illustration of a derived work map. For instance, location component 157 can provide information indicative of the location of each of the points where data was taken, and the operation type component 154 can provide an output indicating that the data at each of those locations corresponded to an agricultural work operation. In that case, map generator 168 can use that information to derive a work map 304 that identifies a geographic area where an agricultural work operation was performed.

Figure 9:
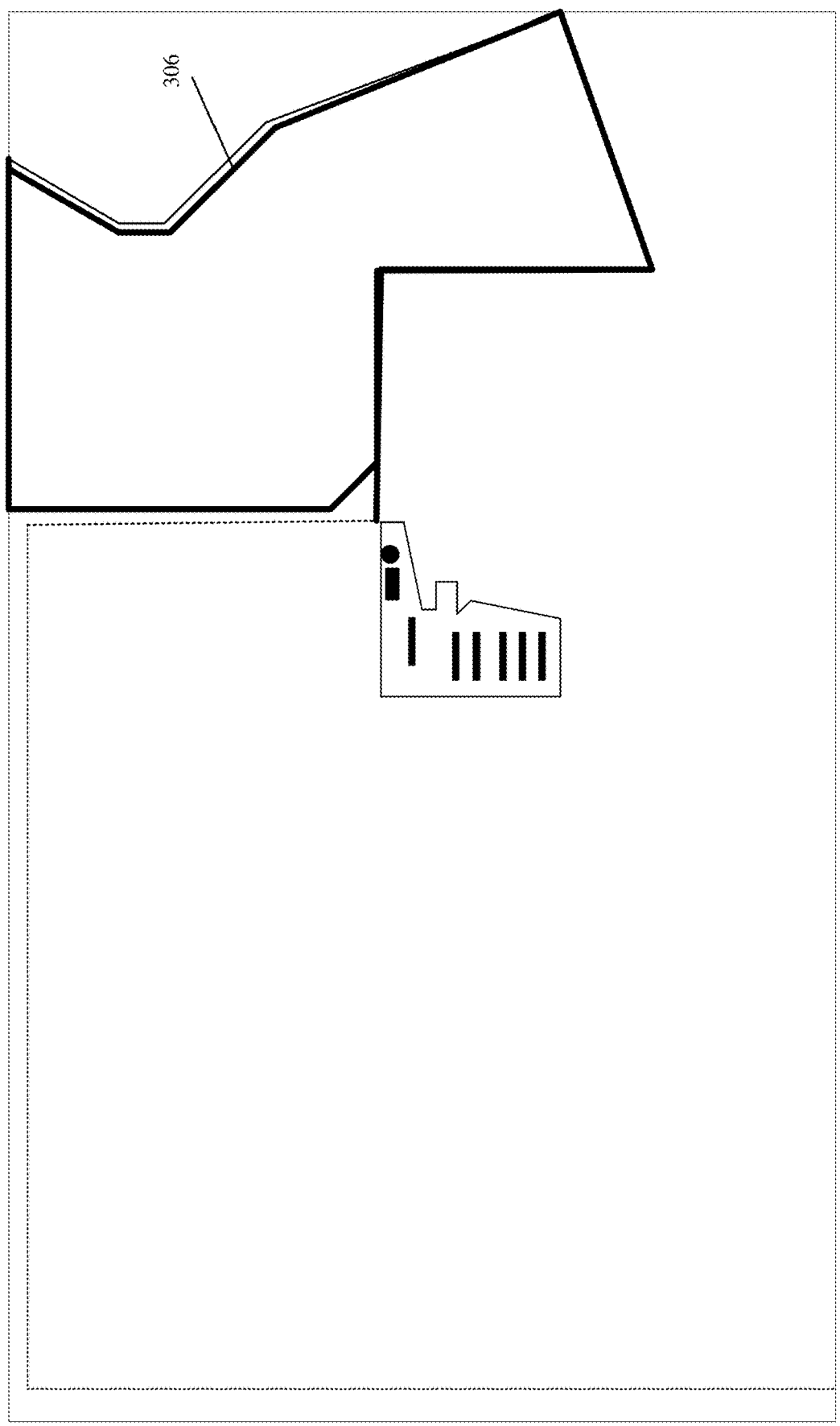
FIG. 9 is a pictorial illustration showing one example of a derived boundary map.

FIG. 9 is a pictorial illustration of one example of a derived boundary map 306. Given the work map 304, the boundary identification system 166 can access the machine dimensions of agricultural machine 102, as well as the outer extent of the map 304, to identify which of the particular data points is on the boundary 306. Those points can be mapped to show the boundary 306.

Figure 10:
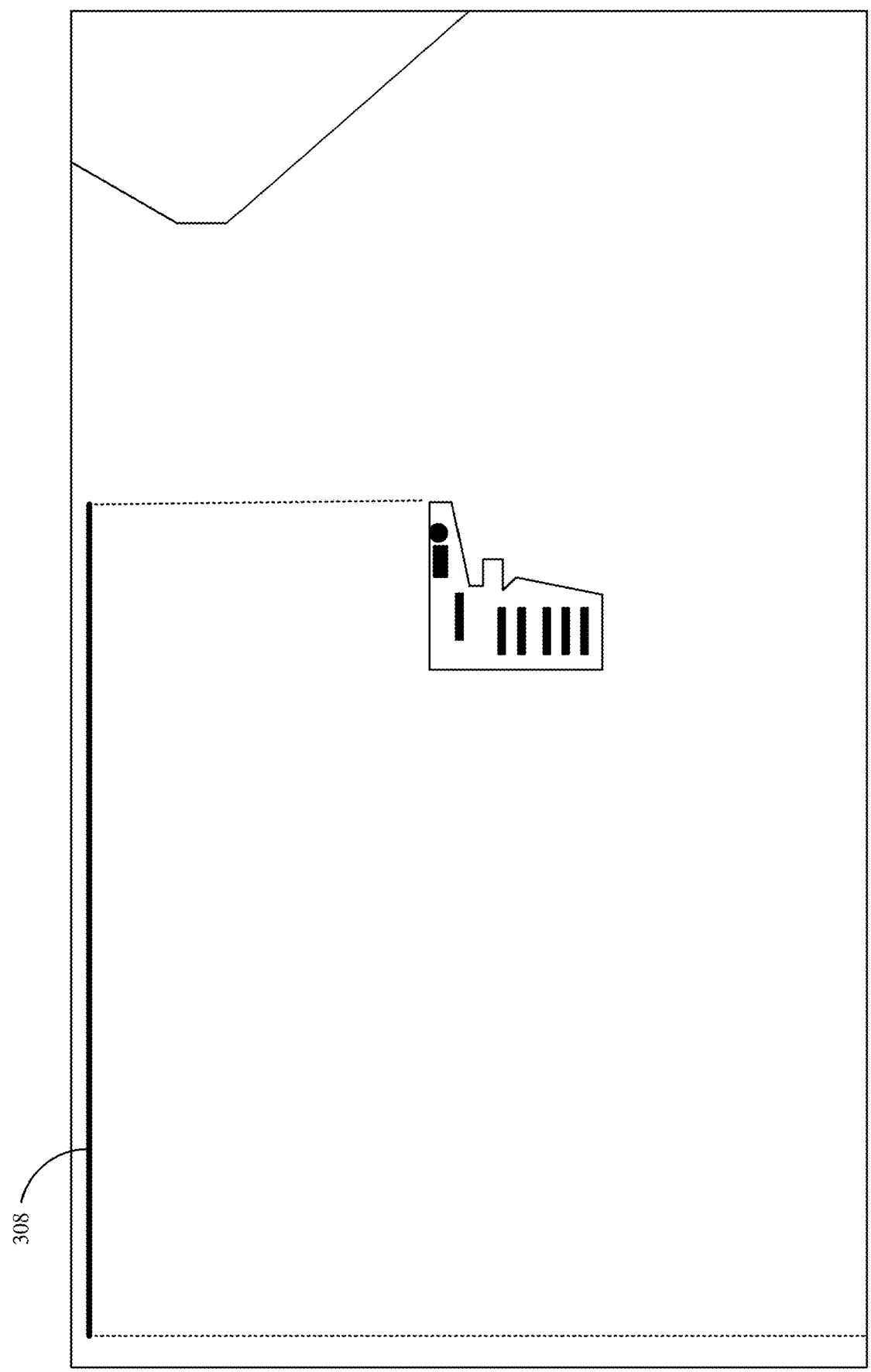
FIG. 10 is a pictorial illustration showing one example of a derived transport map showing a machine route arriving at a field.

FIG. 10 is a pictorial illustration of one example of a derived transport map showing a transport route 308 corresponding to agricultural machine 102 moving to the field prior to performing in the agricultural operation. For instance, route generator 169 can receive information that classifies the data taken at the geographic locations along the transport route 308, as corresponding to a transport operation. Route generator 169 can also identify the machine heading at those points and also determine that those data points were taken at a time before the field operation was performed. Route generator 169 can thus generate the map shown in FIG. 10 to identify route 308 as the route corresponding to that which machine 102 took on its way to the field.

Figure 11:
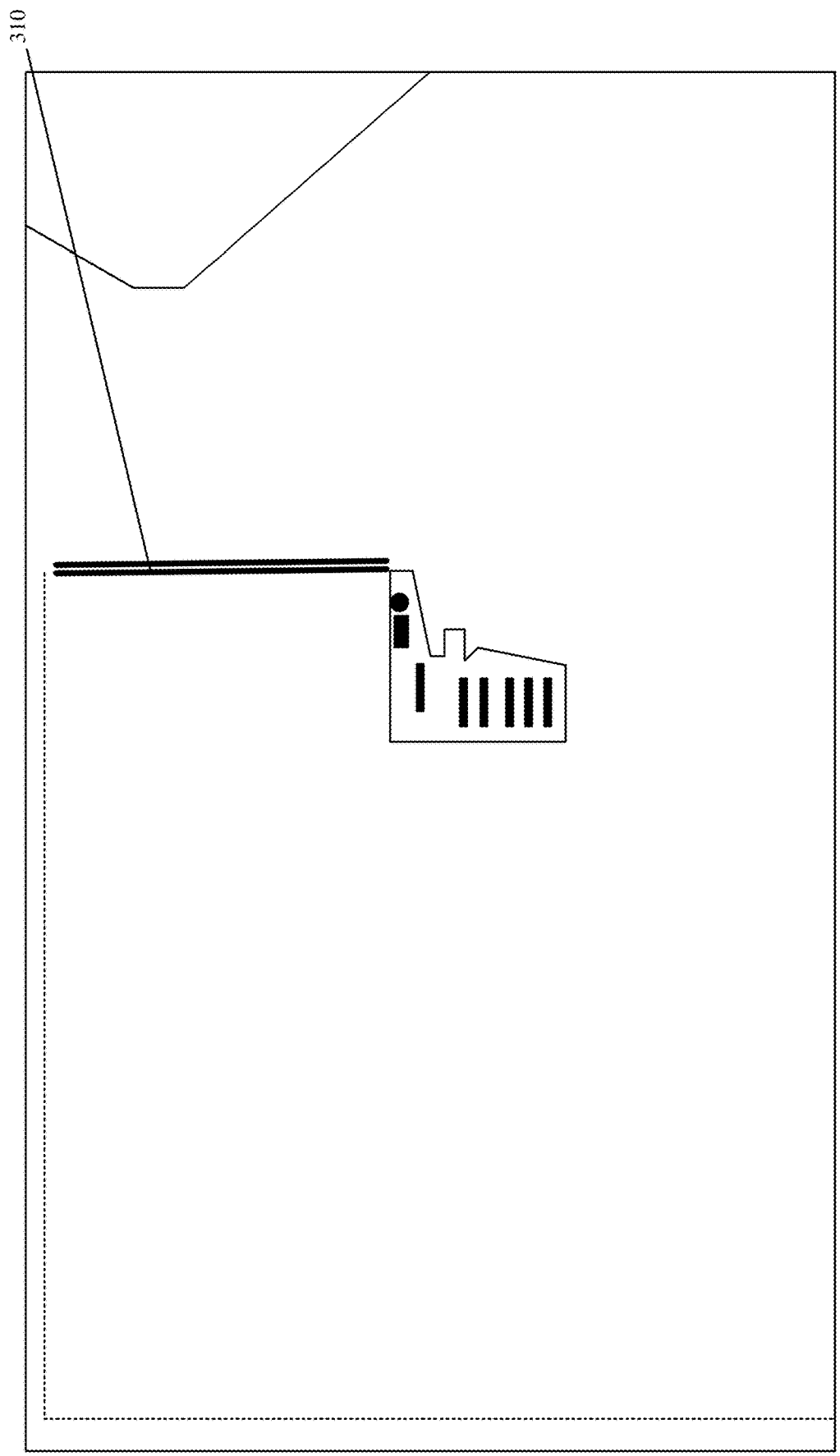
FIG. 11 is a pictorial illustration showing one example of a derived transport map showing a machine route departing from the field.

FIG. 11 is a pictorial illustration showing one example of a derived transport map showing a route 310 corresponding to the transport route taken by machine 102 as machine 102 departs the field. Again, route generator 169 can receive an indication of the geographic locations classified as corresponding to a transport operation, identifying machine heading at those points, and determine that such data was generated at a time after machine 102 performed the agricultural work operation in the field. Route generator 169 can thus output the map shown in FIG. 11, identifying route 310 as the transport route taken as agricultural machine 102 departed the field. Route generator 169 can also identify field entry points which can be used, for example, in defining logistically efficient routes.

It will be noted that the illustrations shown in FIGS. 4-11 are only examples. A wide variety of different maps, routes, data, and other information can be generated using the classified data as well. The illustrations can be output as a classification output for user interaction (confirmation, editing, rejection, etc.). The illustrations can be stored in data store 108 for access by external systems 112 through interface 110, or used in other ways.

It can thus be seen that the present description describes a system in which an agricultural machine may have relatively simple sensing and processing systems and communication capability. For instance, the machine may only sense machine state and location and include processing capability that allows the machine state data and location data to be sent to a remote classification system. The remote classification system can reside in a remote server environment, on another vehicle, on another computing system, or elsewhere, and can perform relatively complicated and high accuracy classification to estimate a wide variety of agronomic and other information that can be used to control future operations, to control data storage systems, to control user interface systems, or that can be used in a wide variety of other ways.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, they can be actuated using touch gestures. Also, where the device that displays them has speech recognition components, the mechanisms can be actuated using speech commands.

A number of data stores have also been discussed. It will be noted that the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components, sensors, generators, and/or logic. It will be appreciated that such systems, components, sensors, generators, and/or logic can be comprised of hardware items (such as processors and associated memory, or other processing components, some of which are described below) that perform the functions associated with those systems, components, sensors, generators, and/or logic. In addition, the systems, components, sensors, generators, and/or logic can be comprised of software that is loaded into a memory and is subsequently executed by a processor or server, or other computing component, as described below. The systems, components, sensors, generators, and/or logic can also be comprised of different combinations of hardware, software, firmware, etc., some examples of which are described below. These are only some examples of different structures that can be used to form the systems, components, sensors, generators, and/or logic described above. Other structures can be used as well.

Figure 12:
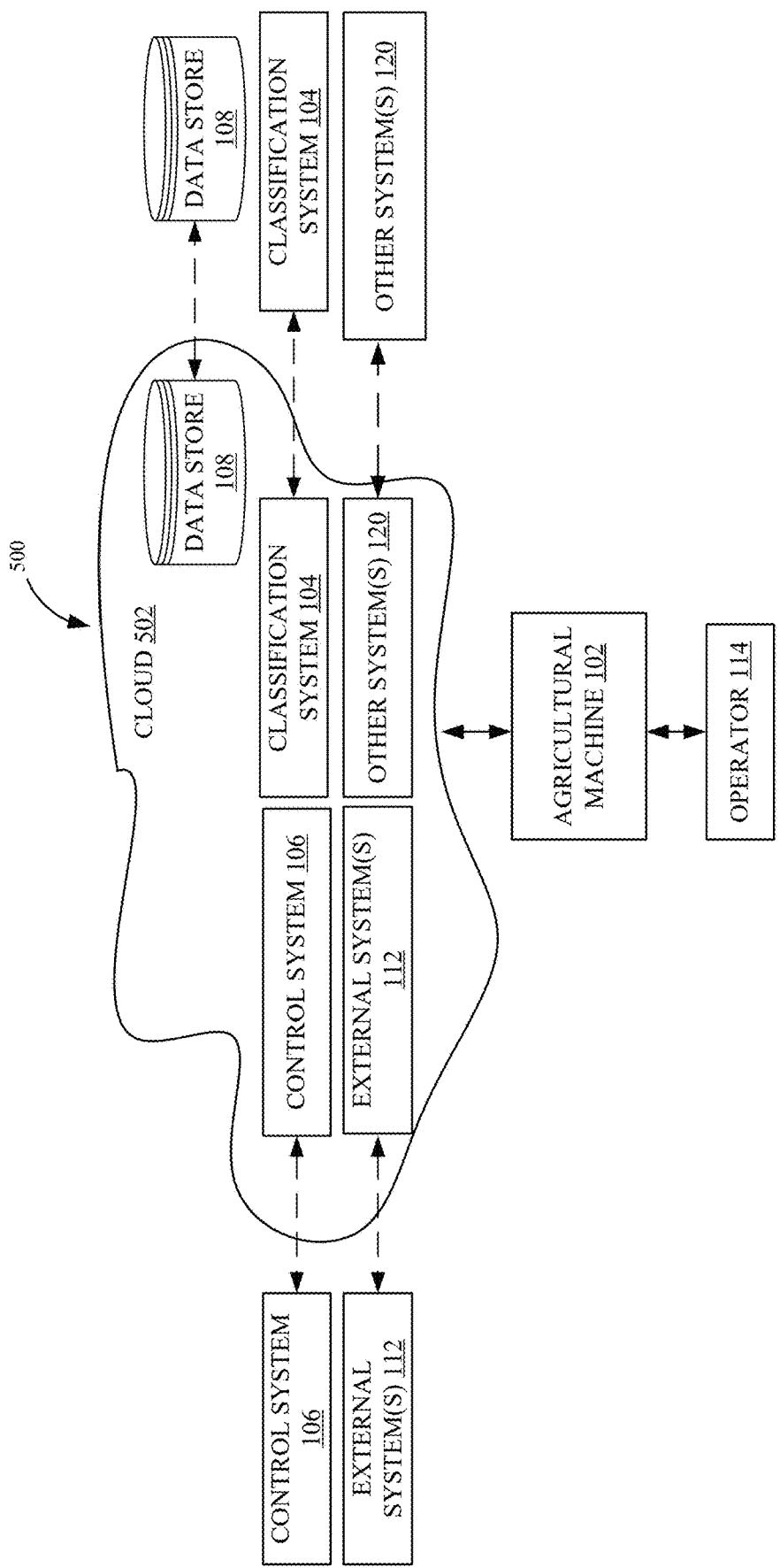
FIG. 12 is a block diagram showing one example of an agricultural system deployed in a remote server architecture.

FIG. 12 is a block diagram of agricultural system 100, shown in FIG. 1, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, the components and functions can be provided from a conventional server, or be installed on client devices directly, or in other ways.

In the example shown in FIG. 12, some items are similar to those shown in previous FIGS. and they are similarly numbered. FIG. 12 specifically shows that systems 104, 106, 120, and 112, and data store 108 can be located at a remote server location 502. Therefore, agricultural machine 102 accesses those systems through remote server location 502.

FIG. 12 also depicts another example of a remote server architecture. FIG. 12 shows that it is also contemplated that some elements of previous FIGS are disposed at remote server location 502 while others are not. By way of example, external systems 112 and/or data store 108 or other systems 120 can be disposed at a location separate from location 502, and accessed through the remote server at location 502. Regardless of where the elements are located, the elements can be accessed directly by machine 102, through a network (either a wide area network or a local area network), the elements can be hosted at a remote site by a service, or the elements can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the machine 102 comes close to the fuel truck for fueling, the system automatically collects the information from the machine 102 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the machine 102 until the machine 102 enters a covered location. The machine 102, itself, can then send the information to the main network.

It will also be noted that the elements of previous FIGS., or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 13:
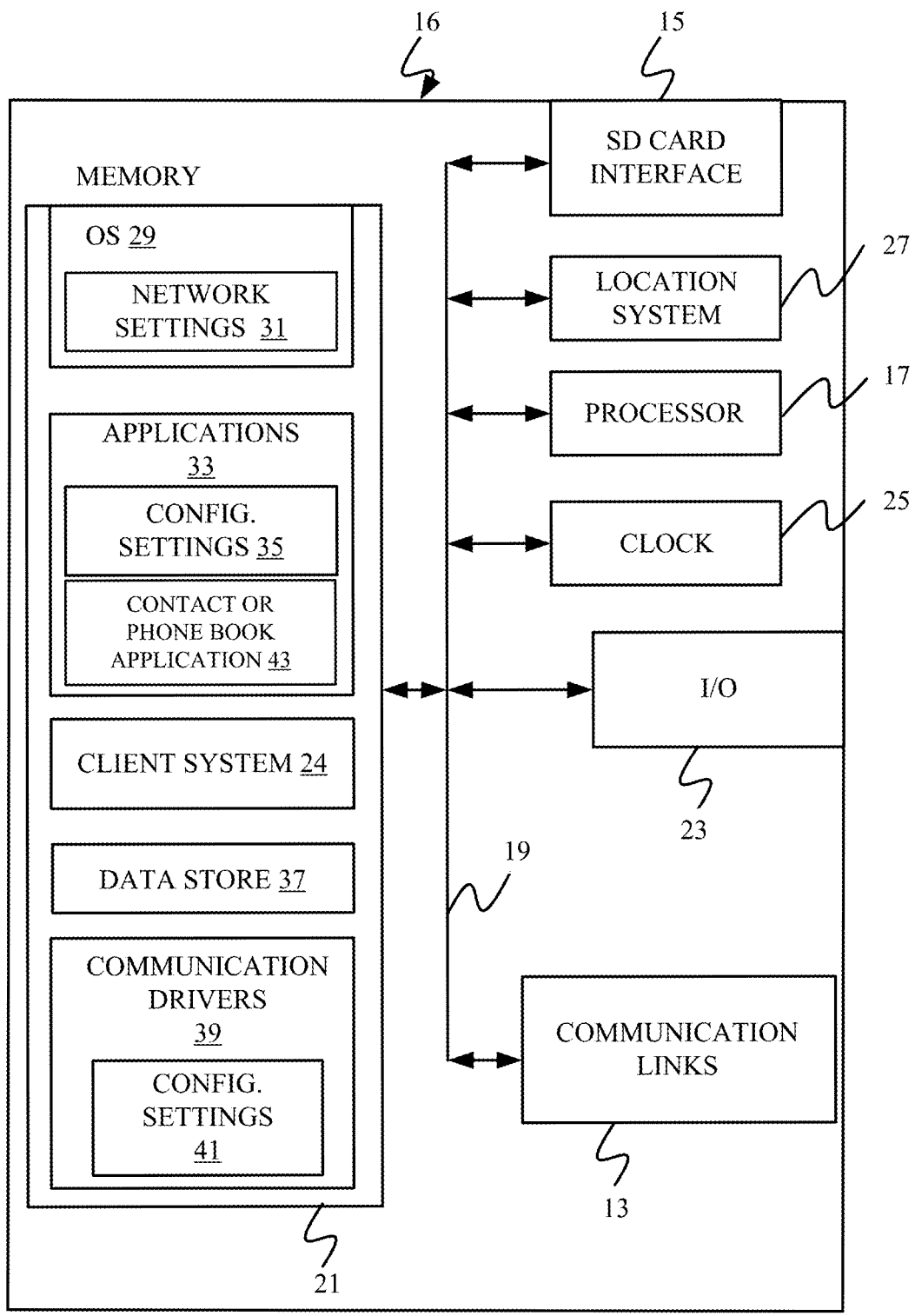
FIGS. 13, 14, and 15 show examples of mobile devices.
Figure 14:
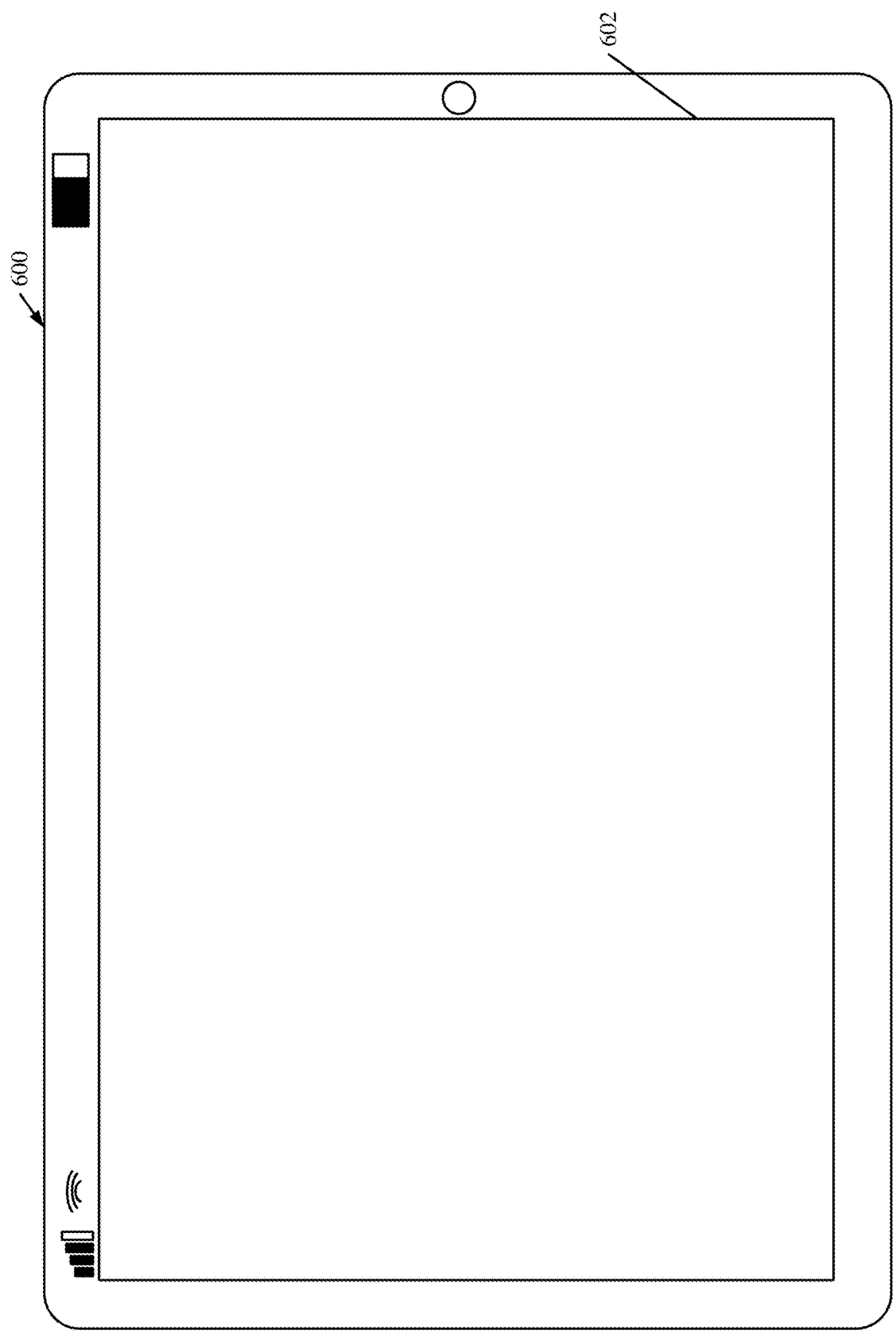
Figure 15:
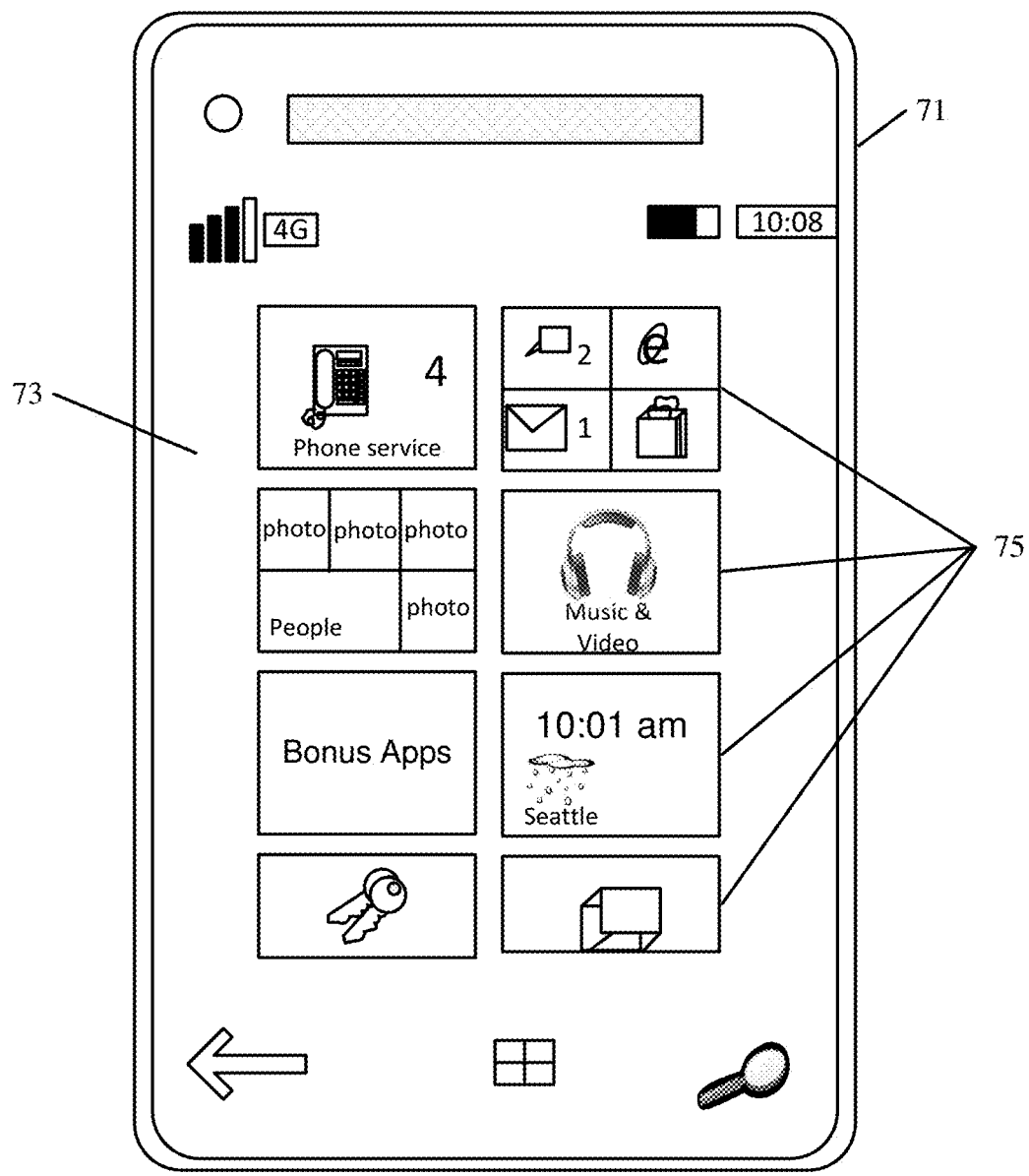

FIG. 13 is a simplified block diagram of one illustrative example of a handheld or mobile computing device that can be used as a user's or client's hand held device 16, in which the present system (or parts of it) can be deployed. For instance, a mobile device can be deployed in the operator compartment of machine 102 for use in generating, processing, or displaying the sensed or other data. FIGS. 14-15 are examples of handheld or mobile devices.

FIG. 13 provides a general block diagram of the components of a client device 16 that can run some components shown in previous FIGS., that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a dead reckoning system, a cellular triangulation system, or other positioning system. System 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 14 shows one example in which device 16 is a tablet computer 600. In FIG. 14, computer 600 is shown with user interface display screen 602. Screen 602 can be a touch screen or a pen-enabled interface that receives inputs from a pen or stylus. Computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 15 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 16:
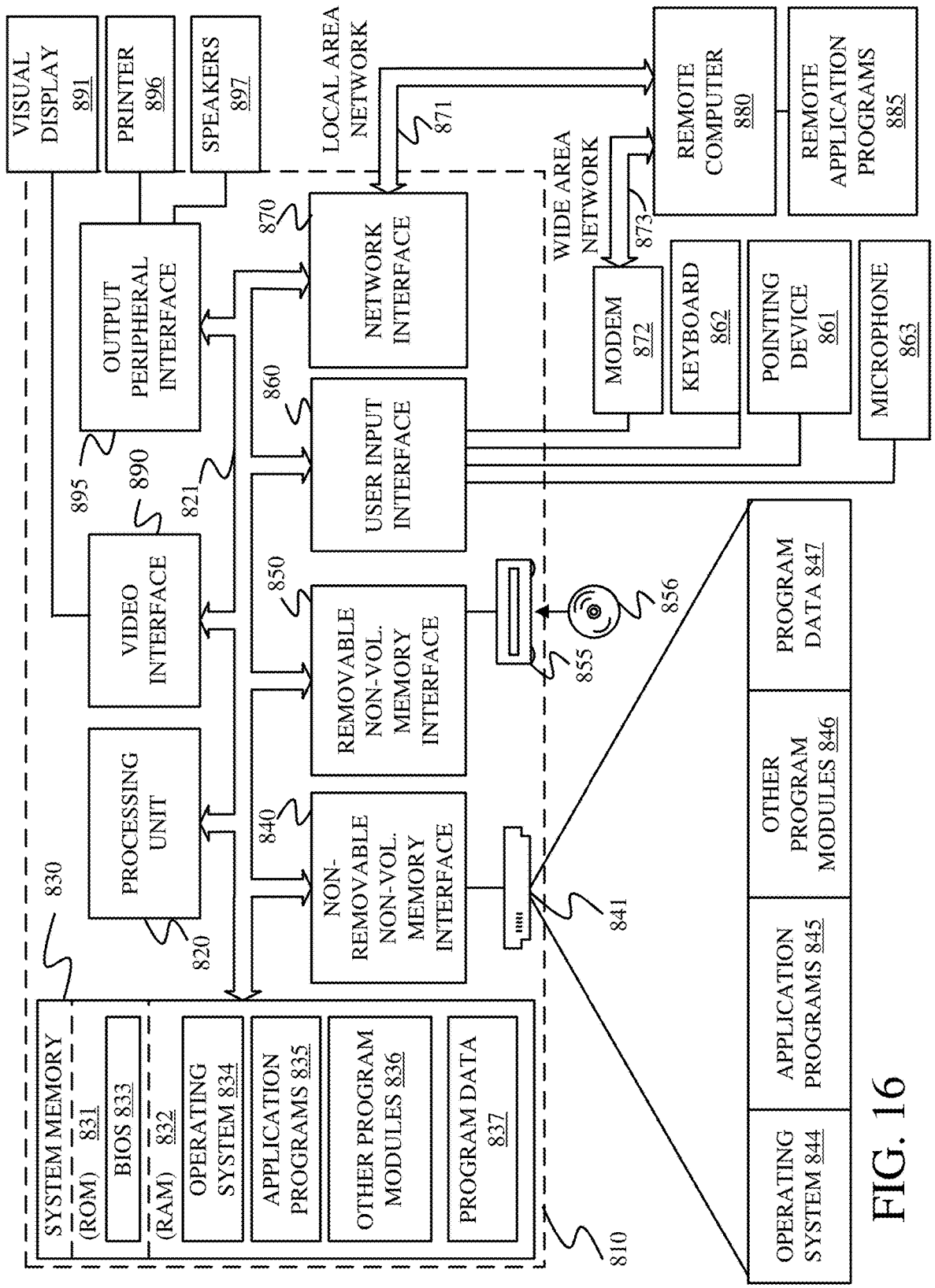
FIG. 16 is a block diagram showing one example of a computing environment that can be used in other systems or architectures described herein.

FIG. 16 is one example of a computing environment in which elements of previous FIGS., or parts of it, (for example) can be deployed. With reference to FIG. 16, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 16.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 16 illustrates operating system 834, application programs 835, other program modules 836, and program data 837.

The computer 810 may also include other removable/non-removable volatile/nonvolatile computer storage media. By way of example only, FIG. 16 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 16, provide storage of computer readable instructions, data structures, program modules and other data for the computer 810. In FIG. 16, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 16 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural system, comprising:
   a sensor, on an agricultural machine, configured to sense a machine characteristic responsive to an agricultural operation performed by the agricultural machine and generate a sensor signal indicative of the machine characteristic;
   one or more processors; and
   memory storing instructions executable by the one or more processors that, when executed by the one or more processors, cause the one or more processors to implement:
   a data collector configured to collect sensor data based on to the sensor signal;
   a classifier configured to receive the sensor data and generate a classification output indicative of an operation characteristic of the agricultural operation based on the sensor data, wherein the classifier comprises a boundary component configured to classify the sensor data as corresponding to an operation boundary and generate the classification output as being indicative of a portion of a geographic boundary of the agricultural operation; and
   a control system configured to:
   generate a work record indicative of the classification output;
   generate a control signal to store the work record; and
   control the agricultural machine or an additional agricultural machine based on the work record.

2. The agricultural system of claim 1 wherein the classifier further comprises:
   a work/transport component configured to classify the sensor data and generate the classification output as being further indicative of whether the agricultural operation is a work operation or a transport operation.

3. The agricultural system of claim 1 wherein the classifier further comprises:
   an operation type component configured to classify the sensor data and generate the classification output as being further indicative of a type of the work operation.

4. The agricultural system of claim 1 wherein the control system comprises:
   a boundary identification system configured to access machine dimension data indicative of physical dimensions of the agricultural machine and generate a boundary output indicative of the operation boundary based on the classification output and the machine dimension data.

5. The agricultural system of claim 2 wherein the classifier further comprises:
   a location component configured to classify the sensor data as being indicative of a heading of the agricultural machine at a geographic location where the sensor data was generated and generate the classification output as being further indicative of the heading of the agricultural machine.

6. The agricultural system of claim 5 wherein the control system comprises:
   a route generator configured to generate a route output indicative of a route of the agricultural machine based on the heading of the agricultural machine indicated by the classification output.

7. The agricultural system of claim 6 wherein the route generator is configured to generate a route output indicative of a route of the agricultural machine in performing the transport operation or the work operation based on the heading of the agricultural machine indicated by the classification output.

8. The agricultural system of claim 1 wherein the classifier is located remotely from the agricultural machine and wherein the agricultural machine is configured to send the collected sensor data to the classifier.

9. The agricultural system of claim 1 wherein the classifier comprises:
a machine learning system.

10. The agricultural system of claim 1 wherein the classifier further comprises:
an output generator configured to generate a confirmation output for user confirmation of the classification output;
a user interface system configured to detect a user interaction with the confirmation output; and
a training system configured to train the classifier based on the user interaction.

11. The agricultural system of claim 1 wherein the classifier comprises:
an artificial neural network.

12. The agricultural system of claim 1 wherein the classifier comprises:
a rules-based classifier.

13. The agricultural system of claim 1 and further comprising:
a data store that stores the work record; and
an interface, exposed by the data store, for accessing the work record from an external system.

14. The agricultural system of claim 1 wherein the sensor comprises:
a position sensor configured to sense a location of the agricultural machine and generate a location sensor output indicative of the location; and
a machine state sensor configured to sense a state of the agricultural machine and generate state sensor output indicative of the state of the agricultural machine.

15. The agricultural system of claim 1 wherein the classifier is configured to receive additional data, in addition to the sensor data, and generate a classification output indicative of the operation characteristic of the agricultural operation based on the sensor data and the additional data, the additional data comprising at least one of: aerial images, previously collected data collected prior to the agricultural machine performing the agricultural operation, user input data, or field historical data.

16. A computer implemented method, comprising:
sensing a machine characteristic responsive to an agricultural operation performed by an agricultural machine;
generating a sensor signal indicative of the machine characteristic;
sending sensor data generated based on the sensor signal to a remote classifier, that is remote from the agricultural machine;
generating a classification output, with the remote classifier, based on the sensor data, wherein generating the classification output comprises generating the classification output as being indicative of a portion of a geographic boundary of the agricultural operation;
generating a work record indicative of the classification output;
generating a control signal to control a data store to store the work record; and
controlling the agricultural machine or an additional agricultural machine based on the work record.

17. The computer implemented method of claim 16 wherein the sensor data includes location data indicative of a geographic location of the agricultural machine and machine state data indicative of a state of the agricultural machine, and wherein generating the classification output comprises:
generating the classification output as being further indicative of a type of the agricultural operation and a location where the agricultural machine performed the agricultural operation.

\* \* \* \* \*